(12) United States Patent
Arulandu et al.

(10) Patent No.: US 10,225,898 B2
(45) Date of Patent: Mar. 5, 2019

(54) DYNAMIC CONTROL CIRCUIT

(71) Applicant: PHILIPS LIGHTING HOLDING B.V., Eindhoven (NL)

(72) Inventors: Kumar Arulandu, Breda (NL); Dmytro Viktorovych Malyna, Eindhoven (NL); Ralph Kurt, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/320,067

(22) PCT Filed: Jun. 8, 2015

(86) PCT No.: PCT/EP2015/062705
§ 371 (c)(1),
(2) Date: Dec. 19, 2016

(87) PCT Pub. No.: WO2015/193137
PCT Pub. Date: Dec. 23, 2015

(65) Prior Publication Data
US 2017/0164438 A1 Jun. 8, 2017

(30) Foreign Application Priority Data
Jun. 17, 2014 (EP) .................... 14172696

(51) Int. Cl.
*H05B 33/08* (2006.01)
*F21K 9/238* (2016.01)

(52) U.S. Cl.
CPC ......... *H05B 33/0824* (2013.01); *F21K 9/238* (2016.08); *H05B 33/0815* (2013.01); *H05B 33/0851* (2013.01); *Y02B 20/383* (2013.01)

(58) Field of Classification Search
None
See application file for complete search history.

(56) References Cited

U.S. PATENT DOCUMENTS 4,721,384 A * 1/1988 Dietrich ............... G01C 3/10
356/3.03
7,605,550 B2 10/2009 Ferentz et al.
(Continued)

FOREIGN PATENT DOCUMENTS

DE 10102352 A1 8/2002
EP 2330869 A1 8/2011
(Continued)

*Primary Examiner* — Douglas W Owens
*Assistant Examiner* — Srinivas Sathiraju
(74) *Attorney, Agent, or Firm* — Akarsh P. Belagodu

(57) ABSTRACT

The invention describes a dynamic control circuit (1) realized for connection in series with an LED arrangement (2), characterized by a first switching element (Q1) realized to provide a path for the LED current ($I_{LED}$), and a monitoring arrangement (M) realized to control the first switching element (Q1) according to the level of the LED current ($I_{LED}$) SO that the dynamic control circuit (1) presents a series impedance ($Z_{dyn}$), which series impedance ($Z_{dyn}$) gradually increases in response to a decreasing LED current ($I_{LED}$) through the LED arrangement (2). The invention also describes a dimmable lighting arrangement (10) comprising an LED arrangement (2); a driver (3) realized to provide an input voltage ($V_{in}$) and an input current ($I_{LED}$) to the LED arrangement (2); and such a dynamic control circuit (1) connected in series with the LED arrangement (2). The invention further describes retrofit LED light-bulb (100); and a method of driving an LED arrangement.

15 Claims, 6 Drawing Sheets

(56) References Cited

U.S. PATENT DOCUMENTS

| | | | |
|---|---|---|---|
| 8,698,407 B1* | 4/2014 | Chen | H05B 33/0812 315/185 R |
| 8,698,497 B2* | 4/2014 | Hollis | G01R 33/385 324/318 |
| 8,922,136 B2* | 12/2014 | Grajcar | H05B 33/0809 315/247 |
| 9,035,563 B2* | 5/2015 | Nuhfer | H05B 33/0815 315/219 |
| 9,072,125 B2* | 6/2015 | King | H05B 37/02 |
| 9,167,662 B2* | 10/2015 | King | H05B 37/02 |
| 9,167,664 B2* | 10/2015 | Xie | H05B 37/02 |
| 9,215,772 B2* | 12/2015 | Sood | H02M 7/04 |
| 9,220,133 B2* | 12/2015 | Salvestrini | H05B 33/0815 |
| 9,380,665 B2* | 6/2016 | Grajcar | H05B 33/0809 |
| 9,420,644 B1* | 8/2016 | Shum | F21V 29/74 |
| 9,474,120 B2* | 10/2016 | Tyrrell | H05B 33/0845 |
| 9,516,720 B2* | 12/2016 | Malyna | H05B 33/0884 |
| 9,526,140 B2* | 12/2016 | Delos Ayllon | H05B 33/0815 |
| 9,565,725 B2* | 2/2017 | Arulandu | H05B 33/0845 |
| 9,655,202 B2* | 5/2017 | Xie | H05B 37/02 |
| 2002/0074953 A1* | 6/2002 | Lovell | H01J 61/56 315/248 |
| 2003/0209997 A1* | 11/2003 | St-Germain | B61L 5/1881 315/291 |
| 2005/0128751 A1* | 6/2005 | Roberge | F21K 9/00 362/276 |
| 2007/0080905 A1* | 4/2007 | Takahara | G09G 3/3233 345/76 |
| 2007/0097043 A1 | 5/2007 | Yang | |
| 2007/0176183 A1* | 8/2007 | Morejon | H05B 33/0827 257/79 |
| 2007/0182338 A1* | 8/2007 | Shteynberg | H05B 33/0815 315/200 R |
| 2007/0182347 A1* | 8/2007 | Shteynberg | H05B 33/0815 315/312 |
| 2008/0062070 A1* | 3/2008 | De Oto | H05B 33/0848 345/46 |
| 2008/0150877 A1* | 6/2008 | Chao | G09G 3/32 345/102 |
| 2009/0196079 A1 | 8/2009 | Nathan | |
| 2010/0156324 A1 | 6/2010 | Nagase et al. | |
| 2012/0074860 A1* | 3/2012 | Lee | H03K 4/501 315/240 |
| 2012/0181940 A1 | 6/2012 | Snelten et al. | |
| 2012/0262059 A1* | 10/2012 | Dohn | F21V 23/002 313/512 |
| 2012/0299492 A1 | 11/2012 | Egawa et al. | |
| 2012/0306502 A1* | 12/2012 | Somayajula | G01R 31/024 324/414 |
| 2013/0106298 A1* | 5/2013 | Datta | H05B 33/0815 315/186 |
| 2013/0342120 A1* | 12/2013 | Creusen | H05B 33/0809 315/193 |
| 2014/0049730 A1* | 2/2014 | Lu | H05B 33/0815 349/69 |
| 2014/0159611 A1* | 6/2014 | Elferich | H05B 33/0803 315/294 |
| 2014/0265897 A1* | 9/2014 | Taipale | H05B 37/02 315/200 R |
| 2015/0048757 A1* | 2/2015 | Boonen | H05B 33/0845 315/294 |
| 2015/0237695 A1* | 8/2015 | Jelaca | H05B 33/0815 315/291 |
| 2015/0256091 A1* | 9/2015 | Melanson | H02M 5/293 315/200 R |
| 2016/0119992 A1* | 4/2016 | Tyrrell | H05B 33/0845 315/200 R |
| 2016/0128142 A1* | 5/2016 | Arulandu | H05B 33/0845 315/200 R |
| 2016/0219665 A1* | 7/2016 | Creusen | H05B 33/083 |

FOREIGN PATENT DOCUMENTS

| | | |
|---|---|---|
| WO | 2011137646 A1 | 11/2011 |
| WO | 2012174525 A1 | 12/2012 |

* cited by examiner

DYNAMIC CONTROL CIRCUIT

CROSS-REFERENCE TO PRIOR APPLICATIONS

This application is the U.S. National Phase application under 35 U.S.C. § 371 of International Application No. PCT/EP2015/062705, filed on Jun. 8, 2015, which claims the benefit of European Patent Application No. 14172696.8, filed on Jun. 17, 2014. These applications are hereby incorporated by reference herein.

FIELD OF THE INVENTION

The invention describes a dynamic control circuit; a dimmable lighting arrangement; a retrofit LED light-bulb; and a method of driving a dimmable LED lighting arrangement.

BACKGROUND OF THE INVENTION

As light-emitting diodes are becoming cheaper and more attractive for use in retrofit lighting applications, low-cost driver solutions are required. Various driver topologies are known from the prior art, for example as described in U.S. Pat. No. 8,698,407 B1, US 2014/0049730 A1, US 2007/0097043 A1, US 2012/0181940 A1 and US 2010/0156324 A1.

In a retrofit LED lighting product, one or more power LEDs are incorporated together with driver circuitry in a standard light-bulb fitting, for example a GU10 fitting. There are a number of ways of powering a retrofit LED lamp from a mains power supply or power converter. However, since some degree of flexibility is desirable to manage different forward voltages of different LEDs, the driver circuitry is usually based on a switched-mode power supply (SMPS). For example, the driver can comprise a single-stage self-oscillating SMPS.

Preferably, a retrofit LED lighting application should be able to be used in conjunction with an already existing dimmer. A widely used type of legacy leading-edge dimmer is usually arranged to follow a rectifier and operates by performing phase cut on the leading portion of the rectified mains voltage. The "phase cut angle" refers to the angle (between 0° and 180°) up to which the dimmer suppresses or cuts a half-wave of the rectified mains voltage signal. An LED lamp driver, which must be arranged between such a legacy dimmer and the LEDs, receives this phase-cut input voltage and must be able to fulfill certain requirements such as providing a minimum holding current. This can be achieved for example by a power converter with a buffer capacitor connected across the output of a switched-mode power supply. The buffer capacitor smoothens the phase-cut voltage at the output of the driver, but voltage ripple on the buffer capacitor will result in some level of ripple on the LED current. During an undimmed or only slightly dimmed mode of operation of the LEDs (small phase cut angle), the LED current is relatively high, so that the current ripple effect is less compared to dimmed mode, for example at a 90° conduction angle, and does not adversely influence the light output. However, with increasing LED efficiency, the equivalent series resistance (ESR) of power LEDs is decreasing, and the ESR of an LED is roughly inversely proportional to its current rating. For an LED with a low ESR, therefore, the voltage ripple on the buffer capacitor will have a significant impact on the LED current ripple, which reaches a maximum at phase cut angles of about 90° and which can cause noticeable flicker on the light output of the LEDs.

One way of reducing the LED current ripple with the aim of suppressing flicker might be to use a larger buffer capacitor. However, since the driver and LEDs are usually implemented in a retrofit light-bulb product, the physical bulb dimensions present design constraints that may rule out the use of a larger capacitor, since physical size generally increases with capacitance. Another way of dealing with the undesirable ripple might be to use an additional power-dissipating resistor in series with the LEDs. However, such a power-dissipating resistor lowers the efficiency of the lighting circuit due to power losses when the LEDs are driven in an undimmed mode of operation. A power-dissipating resistor is therefore unattractive from an environmental point of view, since the trend is towards more energy-efficient lighting solutions.

Therefore, it is an object of the invention to provide an improved way of driving an LED arrangement from a dimmable power supply while avoiding the problems described above.

SUMMARY OF THE INVENTION

The object of the invention is achieved by the dynamic control circuit of claim 1; by the dimmable lighting arrangement of claim 8; by the retrofit LED light-bulb of claim 13; and by the method of claim 14 of driving an LED arrangement.

According to the invention, the dynamic control circuit is realized for connection in series with an LED arrangement, and comprises a first switching element realized to provide a path for the LED current, and a monitoring arrangement realized to control the first switching element according to the level of the LED current so that the dynamic control circuit presents a series impedance to a driver of the LED arrangement, which series impedance gradually increases in response to a decreasing LED current through the LED arrangement. Here, the term "LED current" is to be understood in its accepted meaning as the average LED current through the LED arrangement. The LED current will decrease when a dimmer (preceding the driver) performs a phase-cut on the mains voltage, so that a part of the mains voltage is passed on to the LED driver. Since the series impedance changes in response to the average LED current, the dynamic control circuit according to the invention may be regarded as a "controllable series impedance". The term "gradual increase" as used to describe the series impedance of the dynamic control circuit is to be understood to mean that the impedance increases smoothly in response to a decreasing average LED current, without any significant discontinuity or interruption, and it follows that the series impedance of the dynamic control circuit will gradually decrease in response to an increasing average LED current. In other words, the series impedance of the dynamic control circuit alters smoothly in proportion to the average LED current, for example in an inverse non-linear proportion.

An advantage of the dynamic control circuit according to the invention is that it presents only a low series impedance during non-dimmed or slightly dimmed modes of operation, so that the efficiency of the LED lighting circuit is not adversely affected. However, at very low dimming levels, the impedance presented by the dynamic control circuit is relatively high. The lamp driver including the buffer capacitor of the LED arrangement will "see" this higher impedance, and the buffer capacitor at the output of the driver will be utilized more effectively. Another advantage of the dynamic control circuit according to the invention is that the ripple on the LED current can be reduced significantly. This will be explained in greater detail below. The control circuit according to the invention can respond or react to changes on the buffer capacitor, which exhibits a ripple owing to the sinusoidal input voltage to the dimmer and driver, and can control the discharge of the buffer capacitor during the period wherein the momentary power is lower than the average output power of the switched-mode power converter. For this reason, the control circuit according to the invention may be regarded to as a "dynamic discharge circuit".

According to the invention, the dimmable lighting arrangement comprises an LED arrangement; a driver realized to provide an input voltage and an input current to the LED arrangement; and a dynamic control circuit according to the invention connected in series with the LED arrangement.

An advantage of the dimmable lighting arrangement according to the invention is that the behavior of the LEDs is improved at dimming levels with large phase cut angles, while the high efficiency of the lighting arrangement remains unaffected when operated in an undimmed or only slightly dimmed mode of operation.

According to the invention, a retrofit LED light-bulb comprises a housing with a GU10 socket connector for connecting to a dimmable power supply; an LED arrangement mounted on a circuit board in the housing; and a dynamic control circuit according to the invention connected in series with the LED arrangement.

Light-bulbs with GU10 sockets are widely used in a variety of lighting applications such as domestic lighting. Older lighting fittings were often designed for use with multi-facetted reflector light sources (e.g. MR16 halogen lamps), and were usually designed for use with a dimmer such as a leading-edge phase-cut dimmer. An advantage of the retrofit light-bulb according to the invention is that it can be used to replace a light source such as an MR16 halogen lamp, and can be used in conjunction with most legacy leading-edge phase-cut dimmers. The retrofit LED light-bulb according to the invention can therefore make a significant contribution towards reducing energy consumption in the average home.

According to the invention, the method of driving an LED arrangement comprises the steps of connecting a dynamic control circuit according to the invention in series with the LED arrangement; providing an LED current to the LED arrangement; and operating the dynamic control circuit to effect an increase in its series impedance in response to a decreasing LED current through the LED arrangement.

An advantage of the method according to the invention is that the compatibility of low-ESR LEDs and legacy dimmers can be improved, by increasing the series impedance of the circuit as the LED current decreases. This makes it possible to improve the utilization of a buffer capacitor that is connected at the outputs of the driver. The increased series impedance presented by the dynamic control circuit will compensate for the low ESR of the efficient LEDs. At the same time, the method according to the invention can ensure improved output performance of the LEDs, since flicker at low dimming modes can be favorably reduced or eliminated.

The dependent claims and the following description disclose particularly advantageous embodiments and features of the invention. Features of the embodiments may be combined as appropriate. Features described in the context of one claim category can apply equally to another claim category.

In the following, but without restricting the invention in any way, it may be assumed that the driver comprises a switched-mode power supply, for example, a single stage self-oscillating power supply. It may also be assumed that the driver comprises a buffer capacitor connected across its output to ensure compatibility with a legacy dimmer, preferably a leading-edge phase-cut dimmer.

In the following, the expression "undimmed mode of operation" or "non-dimmed mode of operation" may be understood to mean any mode of operation in which the dimmer conducting angle is close to 180°, for example in a range at which the relative output power LED arrangement is close to 100%. The expression "dimming mode of operation" may be understood to mean any mode of operation in which the dimmer conducting angle is such that the light output is noticeably less than full light output. The terms "very low dimming" or "deep dimming" may be understood to mean a mode of operation in which the dimmer conducting angle is relatively small, for example in the range of about 45° or less, at which the light output of the LEDs reaches a minimum without actually being switched off. Since the legacy dimmers are generally used in conjunction with a full-wave rectifier, the dimmer conducting angle can be at most 180°. The typically used leading-edge dimmers cut a leading portion or fraction of the rectified signal, so that the "phase-cut angle" is generally equivalent to 180° minus the dimmer conducting angle, and vice versa. For example, a phase-cut angle of 45° corresponds to a dimmer conducting angle of 135°.

The controllable series impedance can be achieved, as explained above, in that the dynamic control circuit comprises a first switching element realized to provide a path for the LED current through a current sense resistor, and a monitoring arrangement realized to control the first switching element according to the current through the LED arrangement, i.e. according to the level of series impedance that is to be "seen" by the driver. Therefore, if the LED current decreases, the monitoring arrangement can respond to control the first switching element accordingly.

Preferably, the monitoring arrangement comprises a second switching element arranged to generate a control signal for the first switching element. The switching elements can be realized using any suitable discrete switching components, for example bipolar junction transistors (BJTs) or field-effect transistors (MOSFETs). In a particularly preferred embodiment of the invention, the first switching element (referred to as the "switching transistor" in the following) can be realized using a PNP BJT, and the second switching element (referred to as the "control transistor" in the following) can be realized using an NPN BJT, whereby the switching transistor and control transistor are connected in a thyristor-like arrangement so that when the control transistor is "on", it draws a current from the base terminal of the switching transistor. Preferably, at least the switching transistor has a high current gain. For example, a PNP BJT with a current gain or $h_{FE}$ in the range of 100 can be used as the switching transistor.

During an undimmed operating mode, the average input current to the lighting arrangement is relatively high, and the voltage drop across the current path, i.e. the collector emitter junction of the transistor, is low. In all operating modes, the average driver output current is conducted through the LED arrangement, the switching transistor and the control transistor. In an embodiment based on BJTs, for example, the collector of the control transistor will always provide the required average base current for the switching transistor which in turn will conduct the average output current of the LED driver. In order to provide an emitter current for the switching transistor, the control transistor requires a base current, which can be provided in a number of ways as will be explained below.

However, during a dimmed mode of operation, the dimmer conducting angle decreases, and the average input current to the lighting arrangement is reduced accordingly, so that the voltage drop across the current sense resistor will drop to a level at which the control transistor can only provide a weak drive current to the switching transistor. The voltage across the buffer capacitor will therefore start to rise. Since the forward voltage of the LED arrangement is constant, the voltage at the output of the LED arrangement will therefore also start to rise. As will be explained with the aid of the drawings, the voltage at the output of the LED arrangement will exhibit a larger swing at low LED current level variations, resulting in the "high impedance" behavior of the dynamic control circuit.

Since the input current to the LEDs is essentially a smoothed-out series of current pulses, there will be some degree of ripple on the LED current, which may propagate between components of the dynamic control circuit. Therefore, in a further preferred embodiment of the invention, the monitoring arrangement comprises a filter circuit portion arranged to suppress a ripple current on the control signal of the switching transistor.

As indicated above, newer generation LEDs are more efficient, so that the tendency is towards a lower equivalent series resistance. In a conventional design that replaces high-ESR LEDs with low-ESR LEDs, the size of the buffer capacitor must be increased in order to avoid excessive flicker. However, a capacitor with a higher capacitance is also physically larger, and it may be difficult or impossible to incorporate such a large capacitor in a small housing such as a GU10 lighting fitting. Therefore, in a particularly preferred embodiment of the invention, the circuit components of the dynamic control circuit are chosen on the basis of a desired series impedance at specific LED current levels. For example, the components may be chosen to present a series resistance approaching 1.0 kΩ for an average LED current in the region of 0.01 mA, and a series resistance of at most 10.0Ω for an average LED current in the region of 0.08 mA. The average LED current is a function of the phase-cut angle or the dimming conduction angle, so the series impedance may also be expressed as a function of phase-cut angle. For example, the components may be chosen to present a series resistance approaching 1.0 kΩ for a phase-cut angle of less than 45°, and a series resistance of at most 10.0Ω for a phase-cut angle exceeding 135°.

In a preferred embodiment of the invention, the components of the dynamic control circuit are discrete components chosen to operate solely using a voltage supplied at the output of the LED arrangement. A further advantage of the dynamic control circuit according to the invention is that it does not require explicit connection to a supply voltage, usually referred to as $V_{CC}$, which would be the case for a circuit module realized as an integrated circuit (IC). Instead, the dynamic control circuit according to the invention can operate using the fluctuating voltage at the output of the LED arrangement.

A further significant advantage of the dynamic control circuit according to the invention is that the voltage at the output node of the LED arrangement rises according to the level of dimming, i.e. at low dimming levels (small dimmer conducting angles) the voltage at the output node of the LED arrangement is relatively high, while the LED current is relatively low. This is because the dimmer conducting angle decreases during a dimmed mode of operation as explained above, and the voltage across the buffer capacitor will therefore start to rise. Since the forward voltage of the LED arrangement is nearly constant, the voltage at the output of the LED arrangement will therefore also start to rise. In a preferred embodiment of the lighting arrangement according to the invention, this relationship can be put to good use by a bleeder circuit arrangement realized to bleed a portion of the input current according to a voltage at the output of the LED arrangement. As the voltage at the output node of the LED arrangement increases, the amount of power dissipated by the bleeder increases in proportion. In this way, compatibility of an SMPS driver with a legacy dimmer can be further improved, since excess energy provided by the dimmer at low dimming levels can be easily "disposed of", thereby allowing very low light output at low dimming levels.

In a preferred embodiment of the lighting arrangement according to the invention, the bleeder circuit arrangement comprises an NPN bipolar junction transistor whose base is connected to the output of the LED arrangement. A first power dissipating resistor is connected between the collector and a positive output terminal of the driver, and a second power dissipating resistor is connected between the emitter of the bleeder transistor and the collector of the switching transistor. Preferably, the bleeder transistor has a current gain or $h_{FE}$ in the region of 20 to 100. Clearly, as the voltage at the output node of the LED arrangement increases, the amount of current that can pass through the bleeder transistor will increase accordingly. The total LED current provided by the driver will still effectively pass through the current sense resistor, so that the presence of the bleeder does not adversely affect the performance of the dynamic control circuit.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
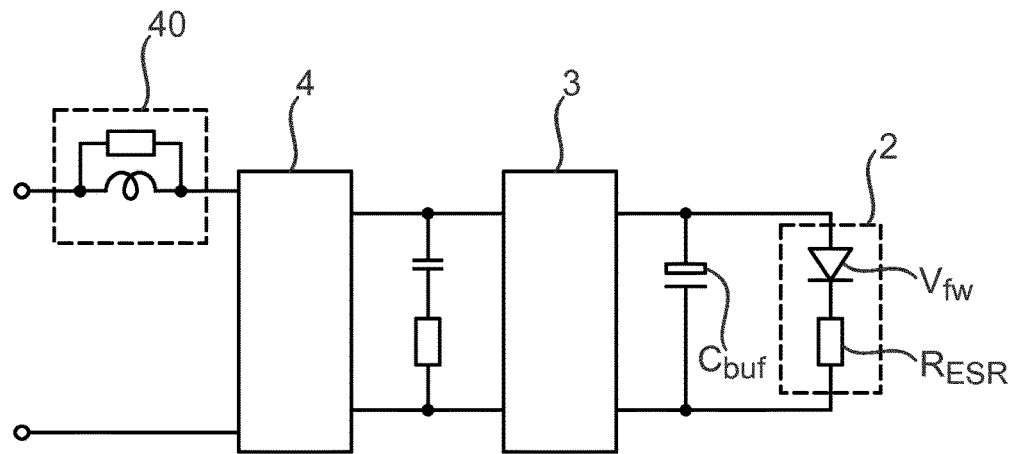
FIG. 1 shows a simplified circuit diagram of a single-stage power converter and an LED light source.

FIG. 1 shows a simplified circuit diagram of a conventional lighting arrangement based on a full-wave rectifier 4 and a single-stage power converter 3 or driver 3 to drive an LED light source 2, which can be one or more power LEDs, usually in a series arrangement of LED junctions. The LED light source 2 can be regarded as a constant voltage source $V_{fw}$ corresponding to the total forward voltage of its LED(s), in series with an equivalent series resistor $R_{ESR}$.

Figure 2:
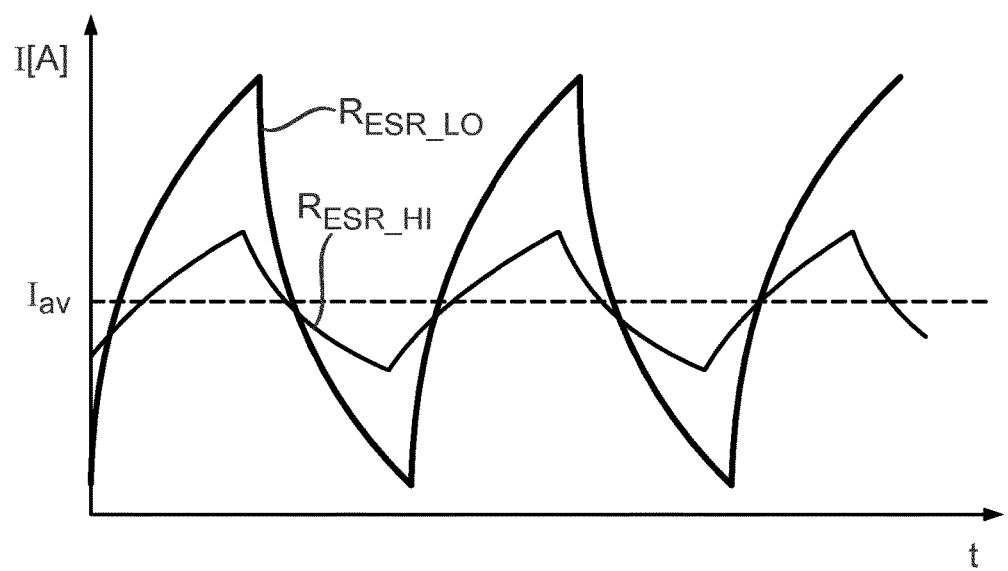
FIG. 2 shows graphs of current ripple for different LED equivalent series resistance values.

FIG. 2 shows graphs of LED current against time for different LED equivalent series resistance values. A first curve $R_{ESR\_HI}$ indicates a relatively low level of current ripple for an LED with relatively high ESR. The light output by this LED will exhibit correspondingly low level of flicker, even when dimmed. A second curve $R_{ESR\_LO}$, corresponding to an LED with lower ESR, shows that the current ripple is considerably increased, even if the average current $I_{av}$ is essentially the same as for the LED with higher ESR. An LED with low ESR, for example a high power LED, might therefore exhibit more noticeable flicker when dimmed to a lower level e.g. at a conduction angle of 90° or less.

Figure 3:
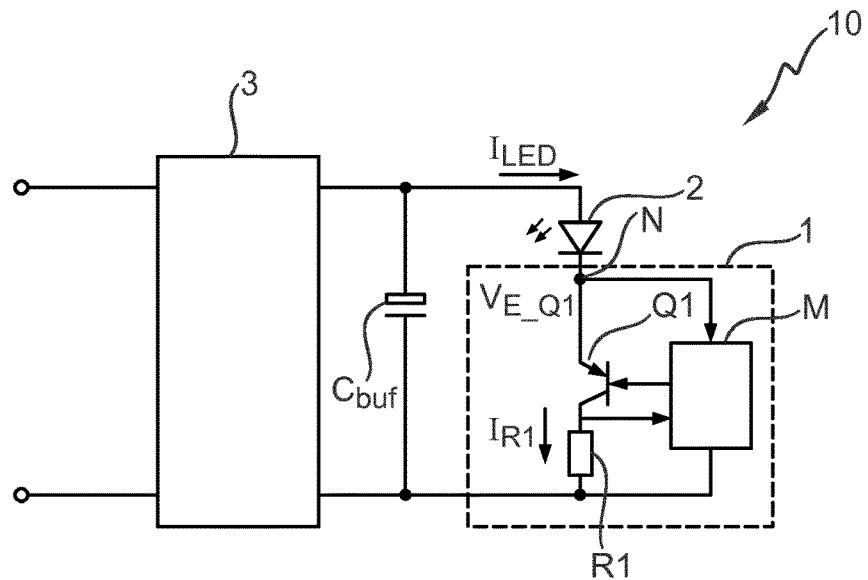
FIG. 3 shows a block diagram of an embodiment of the lighting arrangement according to the invention.

FIG. 3 shows a block diagram of an embodiment of the lighting arrangement 10 according to the invention, with an SPMS driver 3 driving an LED light source 2 connected in series with a dynamic control circuit 1 according to the invention. The lighting arrangement 10 can be realized for example as a retrofit light-bulb for connection to a dimmable power supply. The LED light source 2 can comprise any number of LEDs, for example a string of series-connected power LED junctions. Any suitable LEDs can be used, for example to give a 5-6 W LED arrangement with a forward voltage of 60-120 V and 100-50 mA output current.

It may be assumed that the overall LED light source 2 has a relatively low ESR. The dynamic control circuit 1 is represented as a number of interacting elements Q1, R1, M. A switching element Q1 is connected at the output of the LED arrangement 2. A current sense resistor R1 is connected at the output of the switching element Q1, and the current $I_{R1}$ through the current sense resistor R1 provides an indication of the strength of the LED current $I_{LED}$. A monitoring circuit M monitors the voltage $V_{E\_Q1}$ at node N at the output of the LED arrangement 2, as well as the current $I_{R1}$ through the current sense resistor R1, and controls the operation of the switching element Q1 accordingly. The dynamic control circuit 1 acts to keep the switching element Q1 conducting at any level of LED current. During undimmed operation of the LEDs or at large dimming conducting angles, the dynamic control circuit 1 appears to have a low impedance. During a dimmed mode of operation, the voltage at node N will increase, so that the dynamic control circuit 1 appears to have a high impedance. Effectively, during dimmed operation, the dynamic control circuit 1 acts in the same way that a power-dissipating resistor would behave to reduce the effects of current ripple. However, unlike such an additional power-dissipating resistor, the dynamic control circuit 1 does not dissipate power needlessly during normal undimmed operation since it presents a low impedance when the dimming conduction angle is large, and a high impedance only when the dimming conduction angle is small.

Figure 4:
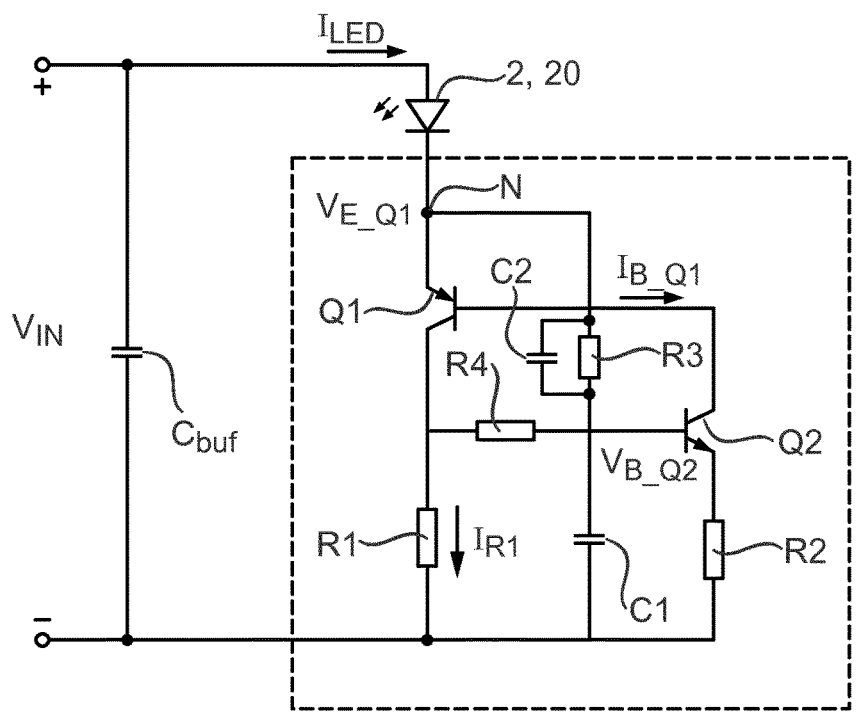
FIG. 4 is a circuit diagram showing a first embodiment of the dynamic control circuit according to the invention incorporated in a lighting arrangement.

FIG. 4 is a circuit diagram showing a first embodiment of the dynamic control circuit 1 according to the invention, connected in series with an LED arrangement 2 across the outputs of a driver. For the sake of illustration, the buffer capacitor $C_{buf}$ is shown, but it should be understood that the buffer capacitor $C_{buf}$ is generally incorporated in the driver. In this exemplary embodiment, the switching element Q1 is PNP bipolar junction transistor with large $h_{FE}$, referred to in the following as the switching transistor Q1, with its emitter connected to an output node N of the LED arrangement 2. The base of the switching transistor Q1 is connected to the collector of a second transistor Q2, in this case an NPN BJT, referred to in the following as the control transistor Q2. In this thyristor-like arrangement, a drive current $I_{B\_Q1}$ through the base of the switching transistor Q1 is provided when the control transistor Q2 is conducting or "on".

Voltage and current signals are filtered by capacitor C1 in order to reduce flicker. Capacitor C2 is used as a "speed-up capacitor" in order to make the circuit more responsive to sudden changes such as quick re-adjustment of the dimming level or at initial power-up conditions. The base current of the control transistor Q2 can be provided by two current paths, either through resistor R4 and/or via resistor R3 in parallel with capacitor C2. A sufficiently high drive current $I_{B\_Q1}$ will ensure that essentially all of the LED current $I_{LED}$ will pass through the switching transistor Q1 in all modes of operation, while a small fraction of the LED current $I_{LED}$ is diverted as the drive current $I_{B\_Q1}$ through the control transistor Q2.

During undimmed mode or at large dimmer conducting angles, the voltage drop across current sense resistor R1 is sufficient to keep the control transistor Q2 fully conducting. The emitter-collector voltage drop across the switching Q1 is small, so that power losses are negligible during undimmed operating mode. In this mode of operation, the base drive current of the control transistor Q2 will mainly be supplied by resistor R4. The switching and control transistors Q1, Q2 will be fully conducting, and as a result the voltage at node N will be minimal. Small current variation in this high current region will only result in minor voltage variation at node N, so that the dynamic control circuit 1 effectively exhibits the behavior of a low impedance circuit.

However, during a dimmed mode of operation, the dimmer conducting angle decreases, and the average input current to the lighting arrangement 2 is reduced accordingly, so that the voltage drop across the current sense resistor R1 will drop to a level at which the control transistor Q2 can only provide a weak drive current $I_{B\_Q1}$ to the switching transistor Q1. The voltage across the buffer capacitor $C_{buf}$ will therefore start to rise. Since the forward voltage of the LED arrangement 2 is constant, the voltage at the output node N of the LED arrangement 2 will therefore also start to rise. Therefore, the base drive current for the control transistor Q2 will increasingly be provided by resistor R3, and the current though R3 at low dimming levels depends on the voltage $V_{E\_Q1}$ at node N. The resistor R3 preferably has a relatively high value, e.g. 47 kΩ, and the voltage at node N must rise (at this stage the voltage across the buffer capacitor $C_{buf}$ will increase, for example by a few volts) in order to provide sufficient base drive current to the control transistor Q2. This allows the buffer capacitor $C_{buf}$ to discharge, so that the level of current ripple on the LED current $I_{LED}$ is minimized, with the result that flicker on the light output is also favorably minimized. Effectively, the voltage $V_{E\_Q1}$ at the output node N will show a larger swing at low current variation which typically corresponds to the behavior of a higher impedance.

Without the dynamic control circuit, the utilization of the energy storage capacity of the buffer capacitor would be determined only by a small voltage variation across the LED arrangement 2. With the dynamic control circuit 1 in series with the LED arrangement 2, the buffer capacitor $C_{buf}$ is used more effectively, since the energy stored by the buffer capacitor is now determined by the voltage drop across the LED arrangement 2 and the dynamic control circuit 1, and this changes as the LED current $I_{LED}$ in response to a dimming activity. Therefore, the energy $E_{Cbuf}$ stored by the buffer capacitor $C_{buf}$ can be expressed as $$E_{Cbuf} = \frac{1}{2} C (V_{max}^2 - V_{min}^2)$$

where C is the capacitance of the buffer capacitor $C_{buf}$, and $V_{max}$ and $V_{min}$ are the maximum and minimum capacitor voltages. For example, a relatively high voltage ripple across the buffer capacitor $C_{buf}$ in dimmed mode during which the capacitor charge and discharge currents are low indicates that the storage energy capacity of the buffer capacitor $C_{buf}$ is more effectively utilized by means of the dynamic control circuit 1, resulting in a favorable smoothening or reduction in the ripple current through the LED arrangement 2.

Figure 5:
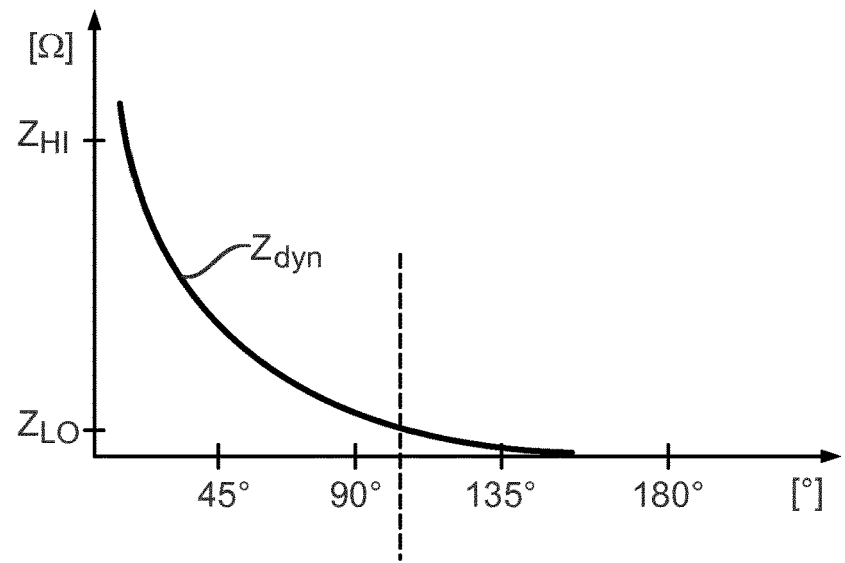
FIG. 5 shows a graph of series impedance of the dynamic control circuit according to the invention.

FIG. 5 shows a graph $Z_{dyn}$ of series impedance of the dynamic control circuit according to the invention. The Y-axis represents the average impedance [Ω] within a half mains cycle (the average impedance is considered to take into account current variations within a half mains cycle), while the X-axis represents the dimmer conduction angle [°] of a half mains cycle. The diagram shows that the series impedance $Z_{dyn}$ presented by the dynamic control circuit according to the invention appears low at high conduction angles, i.e. when the LEDs are not dimmed or only slightly dimmed, so that the driver "sees" only a low series impedance. However, when the LEDs are dimmed, the driver "sees" a higher impedance $Z_{dyn}$, which increases as the conduction angle decreases. For the dynamic control circuit of FIG. 4, based on an implementation using BJTs, the series impedance $Z_{dyn}$ exhibits an exponential decay as a function of dimmer conduction angle. A similar relationship exists between LED current and series impedance $Z_{dyn}$ of the dynamic control circuit, since the LED current decreases as the conduction angle decreases. The components of the dynamic control circuit can be chosen to provide desired series impedance values $Z_{LO}$, $Z_{HI}$ when used in conjunction with a specific LED arrangement and a specific driver. For example, the components may be chosen so that the dynamic control circuit presents a high series impedance $Z_{HI}$ of 1 kΩ at "deep dimming", e.g. a dimmer conducting angle of less than 10°, and a low impedance of only about 10.0Ω at a dimmer conducting angle of 135° or more.

Figure 6:
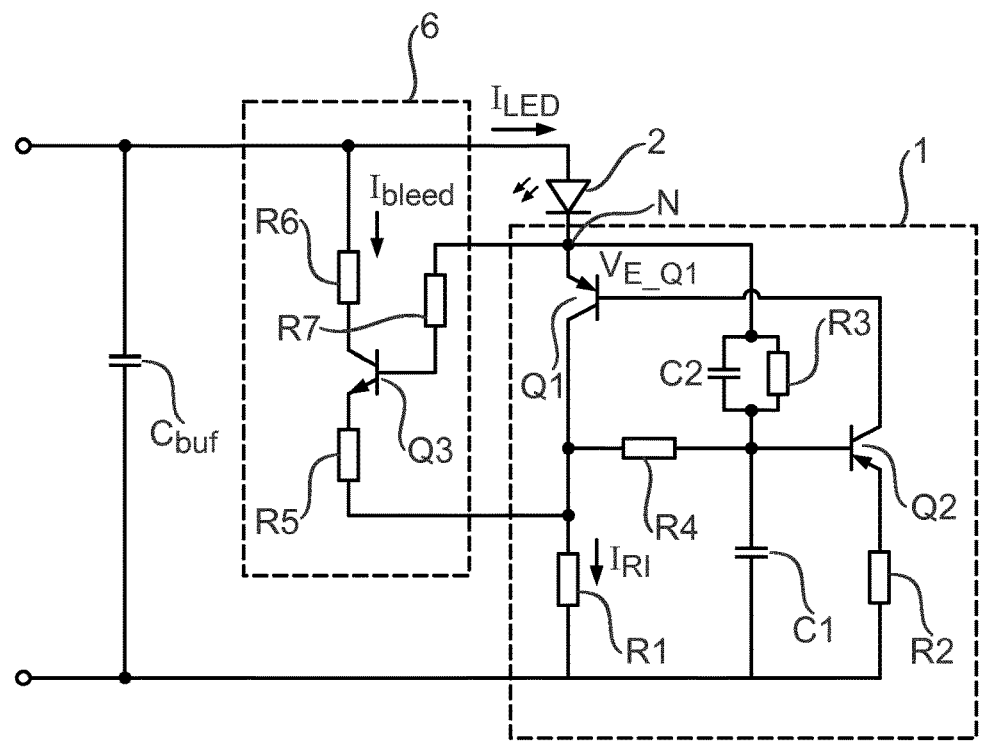
FIG. 6 is a circuit diagram showing a further embodiment of the dynamic control circuit according to the invention.
Figure 7:
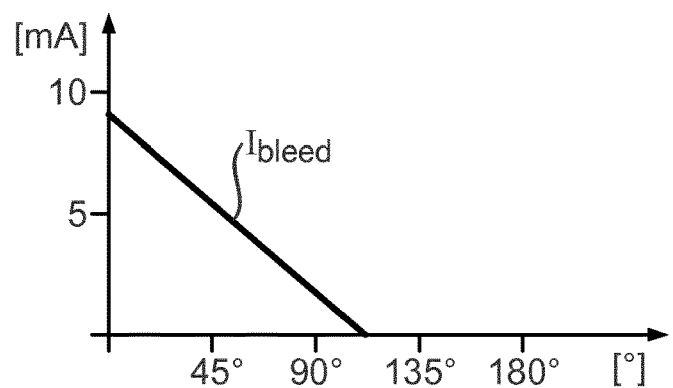
FIG. 7 shows a graph of bleeder current against dimmer conduction angle for the lighting arrangement of FIG. 6.

FIG. 6 is a circuit diagram showing a further embodiment of the lighting arrangement according to the invention. Here, a bleeder circuit 6 is implemented to improve the behavior of the lighting arrangement at deep dimming levels. The bleeder 6 comprises a transistor Q3, here an NPN BJT, and several resistors R5, R6, R7 for the purpose of dissipating power when the LEDs are dimmed to low levels. The bleeder 6 is activated by a control signal derived from node N, since the voltage $V_{E\_Q1}$ at that node N provides information about the average input current to the LEDs. As described above, the voltage $V_{E\_Q1}$ at node N will increase during dimming as the input current $I_{LED}$ to the LEDs decreases. Once the voltage $V_{E\_Q1}$ reaches a certain level, i.e. once the average LED current $I_{LED}$ has dropped to a certain level, the transistor Q3 is turned on. Some current can then pass through the power dissipating resistors R5, R6. In this exemplary embodiment, it may be assumed that the bleeder 6 is realized as a "level 2 bleeder", i.e. the components of the bleeder 6 are mounted on the printed circuit board that carries the LEDs of the LED arrangement 2. This ensures that the power dissipating elements R5, R6 are in close thermal contact with the circuit board, so that the excess energy provided by a legacy dimmer at low dimming levels can be effectively dissipated. The dynamic control circuit 1 according to the invention allows such a favorable placement of the bleeder circuit components R5, R6, R7, Q3 on the same board as the LEDs, since the control signal $V_{E\_Q1}$ originates directly at the output N of the LED arrangement 2, and can therefore directly be used there to activate or de-activate the bleeder 6 as required. FIG. 7 shows a graph of bleeder current $I_{bleed}$ [mA] against dimmer conduction angle [°] for the dynamic control circuit of FIG. 6. The diagram shows that, with a dimmer conduction angle close to 180°, the bleeder 6 remains inactive. The bleeder 6 is only switched on at dimmer conduction angles of less than about 120°, in order to ensure a gradual transition towards deep dimming mode. As the dimmer conduction angle decreases, the voltage $V_{E\_Q1}$ at node N increases, and more current can be bypassed through the power dissipating elements R5, R6 of the bleeder 6. The amount of power dissipated by the bleeder 6 therefore increases with increased phase-cut angle or decreasing dimmer conduction angle.

Figure 8:
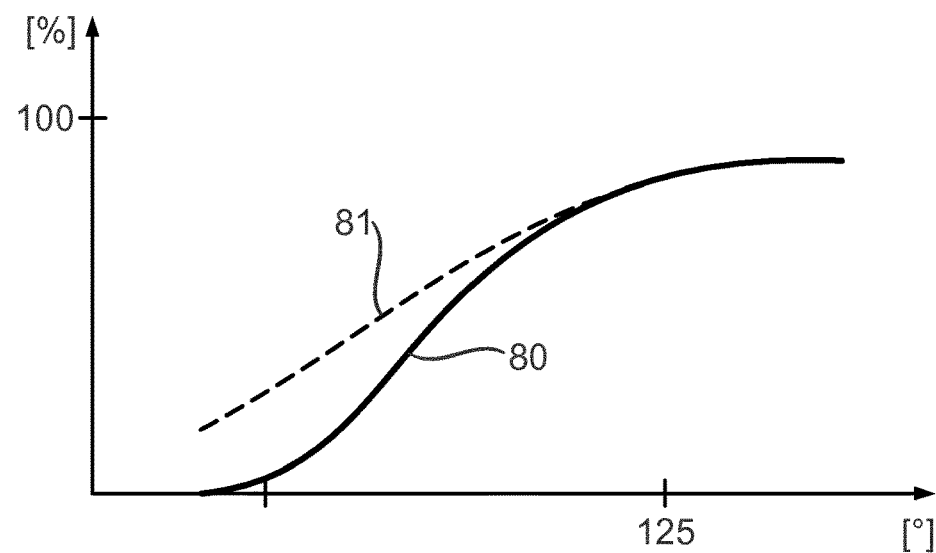
FIG. 8 shows dimming curves of a lighting arrangement according to the invention and a prior art lighting arrangement.

FIG. 8 shows a dimming curve 81 of a prior lighting arrangement without a "level 2" bleeder and a dimming curve 80 of a lighting arrangement according to the invention with a "level 2 bleeder". The X-axis represents dimmer conducting angle [°] of a half mains cycle, so that angles in excess of about 160° correspond to minimal or no dimming, while angles of less than about 50° correspond to low or deep dimming. The Y-axis represents the relative output power in percent. The diagram illustrates the advantage of the bleeder in the lighting arrangement according to the invention, since it is possible to reduce the relative output power significantly during dimming. The reduction in power becomes more noticeable at deep dimming levels with phase cut angles of 75° and below, where the relative output power 80 of the lighting arrangement according to the invention, in which the bleeder is controlled by the voltage at the output of the LED arrangement, significantly less than the relative output power 81 of the lighting arrangement without such a bleeder.

Figure 9:
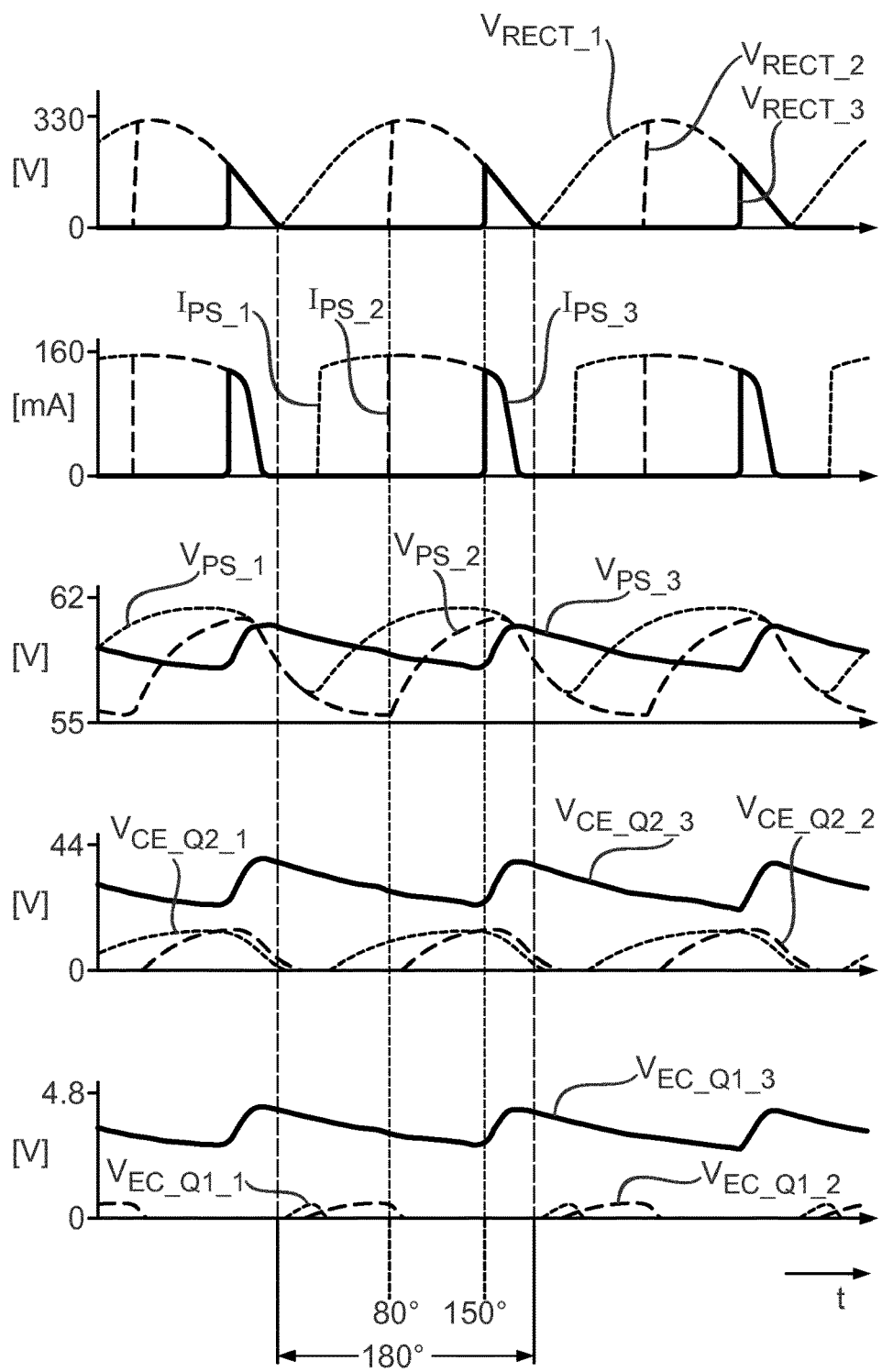
FIG. 9 shows exemplary voltage and current waveforms in different dimming modes for a lighting arrangement according to the invention.

FIG. 9 shows exemplary voltage and current waveforms corresponding to three modes of operation of a lighting arrangement according to the invention, in which an SMPS driver is used to drive an LED arrangement, and in which a buffer capacitor $C_{buf}$ is connected across the output of the driver 3 as shown for example in FIG. 3. Each mode of operation is associated with a certain line type. A first mode (dotted line) shows waveforms $V_{RECT\_1}$, $I_{PS\_1}$, $V_{PS\_1}$, $V_{CE\_Q2\_1}$, $V_{EC\_Q1\_1}$ associated with an undimmed mode of operation (dimmer conducting angle is essentially 180°); a second mode (broken line) shows waveforms $V_{RECT\_2}$, $I_{PS\_2}$, $V_{PS\_2}$, $V_{CE\_Q2\_2}$, $V_{EC\_Q1\_2}$ associated with a dimmed mode of operation (dimmer conducting angle of about 100°; phase-cut angle of about 80°); and a third mode (solid line) shows waveforms $V_{RECT\_3}$, $I_{PS\_3}$, $V_{PS\_3}$, $V_{CE\_Q2\_3}$, $V_{EC\_Q1\_3}$ associated with a deep dimmed mode of operation (dimmer conducting angle of only about 30°; phase-cut angle of about) 150°. The upper part of the diagram shows the rectified half mains cycles $V_{RECT\_1}$, $V_{RECT\_2}$, $V_{RECT\_3}$ after being phase-cut by a leading-edge dimmer. In the case of deep dimming, only a small fraction remains of the rectified input voltage, as indicated by the severely phase-cut signal $V_{RECT\_3}$. The next part of the diagram shows that the total current $I_{PS\_1}$, $I_{PS\_2}$, $I_{PS\_3}$ supplied by the SMPS to the LED arrangement decreases significantly as the dimmer conduction angle decreases. The phase-cut driver output waveforms are smoothed by the buffer capacitor $C_{buf}$ across the driver's output, and the next part of the diagram shows the smoothed voltage outputs $V_{PS\_1}$, $V_{PS\_2}$, $V_{PS\_3}$ for the three different dimming levels.

As explained above, the low current values during dimming result in a low voltage drop across the current sense resistor R1, with the result that the control transistor Q2 is turned off, and the switching transistor Q1 can only draw a very low current. As a result, the voltage across the buffer capacitor $C_{buf}$ starts to increase and the voltage $V_{E\_Q1}$ at node N rises accordingly, so that the dynamic control circuit appears to present a high series impedance $Z_{dyn}$ as illustrated in FIG. 5. As the voltage $V_{E\_Q1}$ at node N rises, ultimately a sufficient drive voltage is reached at the base of the control transistor Q2, which can then draw a larger drive current $I_{B\_Q1}$. The switching transistor Q1 has a high current gain and is therefore able to conduct more current as its drive current $I_{B\_Q1}$ increases, so that the buffer capacitor $C_{buf}$ can discharge through the LED arrangement 2.

The diagram also shows the collector-emitter voltage drop $V_{CE\_Q2\_1}$, $V_{CE\_Q2\_2}$, $V_{CE\_Q2\_3}$ of the control transistor Q2 and the emitter-collector voltage drop $V_{EC\_Q1\_1}$, $V_{EC\_Q1\_2}$, $V_{EC\_Q1\_3}$ across the switching transistor Q1 for the three dimming levels, illustrating the effect of the increased voltage $V_{E\_Q1}$ at node N.

Figure 10:
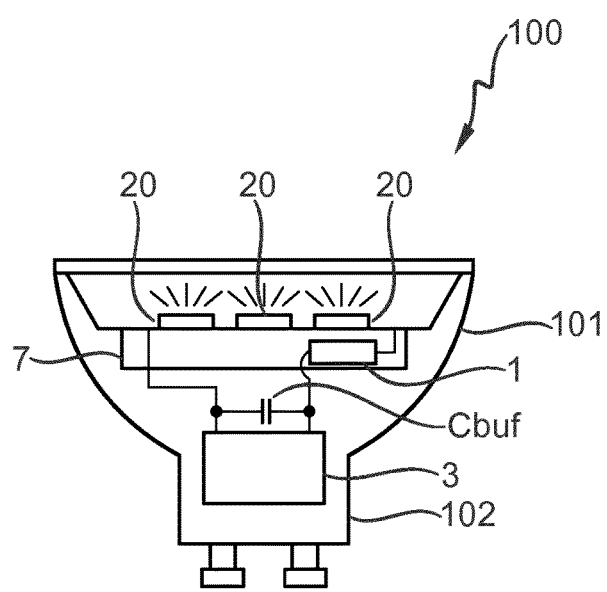
FIG. 10 is a schematic representation of an embodiment of a retrofit light-bulb according to the invention.

FIG. 10 is a schematic representation of a retrofit light-bulb 100 according to the invention, which can be used to replace a more energy-intensive halogen light-bulb. The light-bulb 100 comprises a housing 101 and a GU10 connector. The housing and connector can correspond in design to those of an MR16 halogen light-bulb, for example. Instead of a halogen light source, a string of efficient power LED junctions 20 is used to provide light. The LEDs 20 are mounted to a circuit board 7, and a dynamic control circuit 1 according to the invention is connected in series with the LEDs 20 to compensate for their low ESR. An SMPS driver is incorporated in the lamp body, and a buffer capacitor $C_{buf}$ is connected across its outputs so that compatibility is ensured when the lamp 100 is connected to a power supply with a legacy dimmer (not shown).

Although the present invention has been disclosed in the form of preferred embodiments and variations thereon, it will be understood that numerous additional modifications and variations could be made thereto without departing from the scope of the invention. For example, the dynamic control circuit according to the invention can be used to good effect in any LED circuit in which mains sinusoidal ripple should be suppressed to reduce or eliminate flicker.

For the sake of clarity, it is to be understood that the use of "a" or "an" throughout this application does not exclude a plurality, and "comprising" does not exclude other steps or elements.

The invention claimed is:

1. A dynamic control circuit realized for connection in series with a Light Emitting Diode (LED) arrangement, characterized by a first switching element realized to provide a path for the LED current, and a monitoring arrangement realized to control the first switching element according to the level of the LED current so that the dynamic control circuit presents a series impedance which increases in response to a decreasing LED current through the LED arrangement, wherein the series impedance is inversely non-linearly proportional to the LED current.

2. The dynamic control circuit according to claim 1, wherein the monitoring arrangement comprises a second switching element arranged to generate a control signal to control the operation of the first switching element.

3. The dynamic control circuit according to claim 1, wherein the monitoring arrangement comprises a filter circuit portion arranged to filter the control signal of the first switching element.

4. The dynamic control circuit according to claim 1, wherein the dynamic control circuit comprises only discrete components arranged to operate on a voltage supplied at the output of the LED arrangement.

5. The dynamic control circuit according to claim 1, wherein the components of the dynamic control circuit are chosen on the basis of a desired series impedance at specific LED current levels.

6. The dynamic control circuit according to claim 1, wherein the first switching element comprises a bipolar junction transistor.

7. The dynamic control circuit according to claim 1, realized to present a series impedance of at least 10.00, for a phase-cut angle less than 45° and at most 0.10, for a phase-cut angle greater than 135°.

8. A dimmable lighting arrangement comprising:
   an LED arrangement;
   a driver realized to provide an input current to the LED arrangement; and
   a dynamic control circuit according to claim 1 connected in series with the LED arrangement.

9. The lighting arrangement according to 8, comprising a bleeder circuit arrangement realized to bleed a portion of the input current according to a voltage at the output of the LED arrangement.

10. The lighting arrangement according to 9, wherein the bleeder circuit arrangement comprises an NPN bipolar junction transistor whose base is connected to an output of the LED arrangement.

11. The lighting arrangement according to claim 8, wherein the driver comprises a switched-mode power supply.

12. The lighting arrangement according to claim 8, comprising a buffer capacitor connected across the outputs of the driver.

13. A retrofit LED light-bulb, comprising:
    a housing with a GU10 socket connector for connecting to a dimmable power supply; an LED arrangement comprising a number of LEDs mounted on a circuit board in the housing; and
    a dynamic control circuit according to claim 1 connected in series with the LED arrangement.

14. A method of driving an LED arrangement, comprising the steps of:
    connecting a dynamic control circuit in series with the LED arrangement, the dynamic control circuit comprising a switching element;
    providing an LED current to the LED arrangement, wherein the switching element is arranged to provide a path for the LED current; and
    operating the switching element of the dynamic control circuit to affect an increase in its series impedance in response to a decrease in LED current through the LED arrangement, wherein the series impedance is inversely non-linearly proportional to the LED current.

15. The dynamic control circuit according to claim 1, realized to present a series impedance of at least 1000.00 for a phase-cut angle less than 45° and to present a series impedance of at most 100.00 for a phase-cut angle greater than 135°.

* * * * *